(12) United States Patent
Gutierrez et al.

(10) Patent No.: US 12,541,813 B2
(45) Date of Patent: Feb. 3, 2026

(54) DYNAMIC KERNEL MEMORY SPACE ALLOCATION

(71) Applicant: ADVANCED MICRO DEVICES, INC., Santa Clara, CA (US)

(72) Inventors: Anthony Gutierrez, Bellevue, WA (US); Muhammad Amber Hassaan, Austin, TX (US); Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 248 days.

(21) Appl. No.: 18/103,322

(22) Filed: Jan. 30, 2023

(65) Prior Publication Data

US 2023/0196502 A1 Jun. 22, 2023

Related U.S. Application Data

(63) Continuation of application No. 16/138,708, filed on Sep. 21, 2018.

(51) Int. Cl.
*G06F 12/02* (2006.01)
*G06F 9/30* (2018.01)
*G06T 1/20* (2006.01)
*G06T 1/60* (2006.01)

(52) U.S. Cl.
CPC ............ *G06T 1/60* (2013.01); *G06F 9/30098* (2013.01); *G06F 12/02* (2013.01); *G06F 12/023* (2013.01); *G06T 1/20* (2013.01)

(58) Field of Classification Search
CPC .... G06F 9/30098; G06F 12/02; G06F 12/023; G06T 1/60; G06T 1/20
USPC .......................................................... 711/170
See application file for complete search history.

(56) References Cited

U.S. PATENT DOCUMENTS

| | | | |
|---|---|---|---|
| 9,244,828 B2 * | 1/2016 | Gaster | G06F 12/0223 |
| 2018/0114290 A1 * | 4/2018 | Paltashev | G06T 1/20 |
| 2020/0004993 A1 * | 1/2020 | Volos | G06F 21/577 |
| 2020/0065012 A1 * | 2/2020 | Breslow | G06F 3/0604 |
| 2020/0081638 A1 * | 3/2020 | Zhou | G06F 3/0631 |

* cited by examiner

*Primary Examiner* — Than Nguyen

(57) ABSTRACT

A processing unit includes one or more processor cores and a set of registers to store configuration information for the processing unit. The processing unit also includes a coprocessor configured to receive a request to modify a memory allocation for a kernel concurrently with the kernel executing on the at least one processor core. The coprocessor is configured to modify the memory allocation by modifying the configuration information stored in the set of registers. In some cases, initial configuration information is provided to the set of registers by a different processing unit. The initial configuration information is stored in the set of registers prior to the coprocessor modifying the configuration information.

20 Claims, 4 Drawing Sheets

DYNAMIC KERNEL MEMORY SPACE ALLOCATION

CROSS-REFERENCE TO RELATED APPLICATIONS

The present application is a Continuation application of U.S. patent application Ser. No. 16/138,708, entitled "DYNAMIC KERNEL MEMORY SPACE ALLOCATION", and filed on Sep. 21, 2018, the entirety of which is incorporated by reference herein.

STATEMENT OF SPONSORED RESEARCH

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Conventional processing systems include a central processing unit (CPU) and a graphics processing unit (GPU). The CPU typically hosts an operating system (OS) and handles memory management tasks such as allocating virtual memory address spaces, configuring page tables including virtual-to-physical memory address translations, managing translation lookaside buffers, memory management units, input/output memory management units, and the like. The CPU also launches kernels for execution on the GPU, e.g., by issuing draw calls. The GPU typically implements multiple compute units that allow the GPU to execute the kernel as multiple threads executing the same instructions on different data sets. The threads are grouped into workgroups that are executed concurrently or in parallel on corresponding compute units. The CPU allocates memory to the GPU for execution of a kernel by configuring a set of registers in the GPU to define the memory allocation. The amount of memory allocated to the GPU is set to the maximum amount of memory that the GPU is expected to need to execute the kernel. The memory allocation remains static until the kernel completes execution and the GPU transmits a request for a new memory allocation to the CPU.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
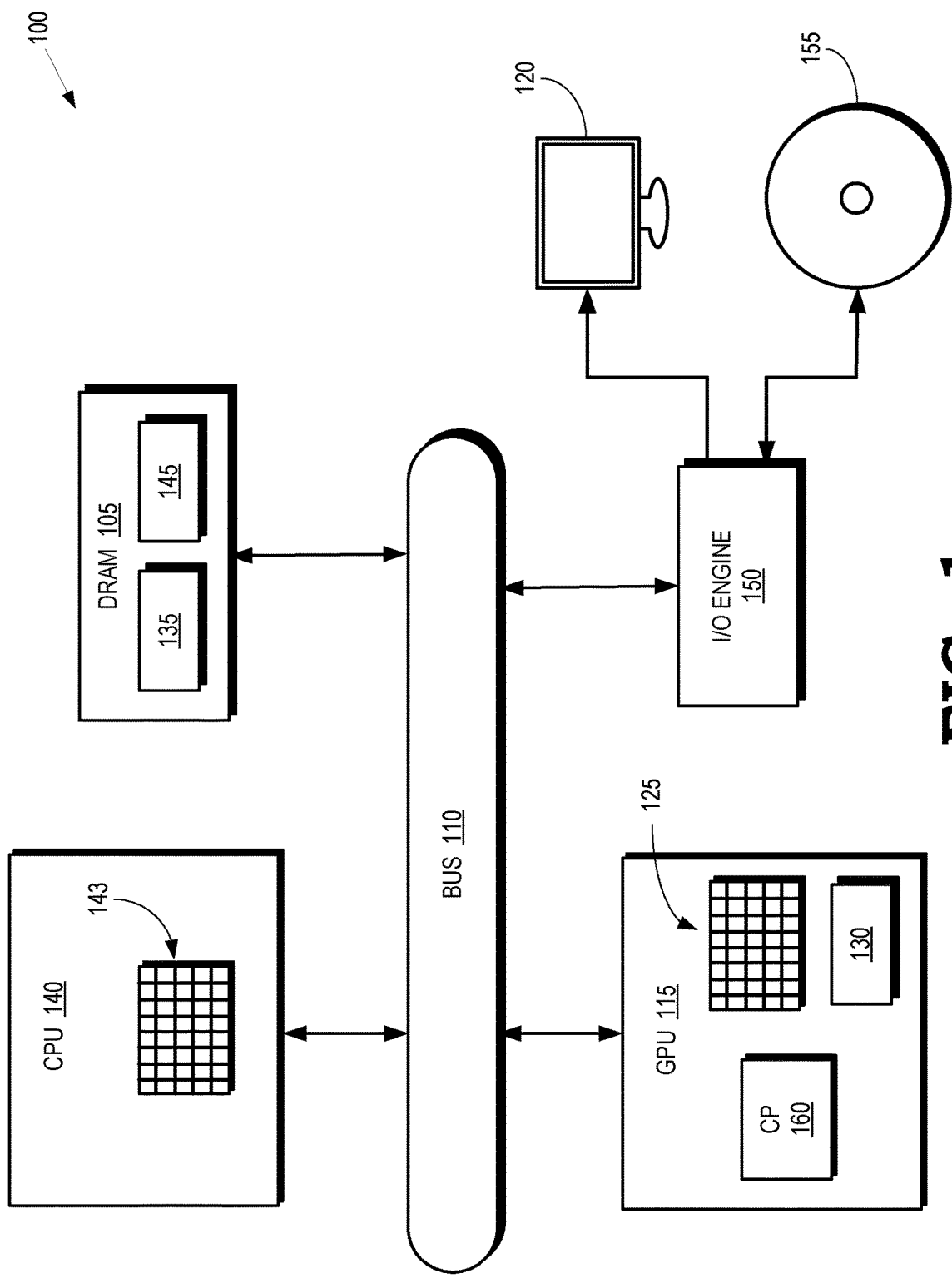
FIG. 1 is a block diagram of a processing device in accordance with some embodiments.

Kernels executing on a GPU cannot allocate memory on demand or free previously allocated memory resources that are no longer needed. Instead, kernels that execute on GPUs are required to pin pre-allocated memory pages in DRAM or use demand paging, in which the OS running on the CPU allocates pages in physical memory in response to a page fault indicating that the kernel attempted to access a page that was not available in the physical memory. Demand paging is very costly and is therefore often disabled. If a kernel is unable to pin its memory pages in DRAM and demand paging is disabled, the workgroups in the kernel are split across multiple physical GPU devices, which leads to high overheads due to network communication and synchronization requirements. Furthermore, memory resources allocated to a kernel, including virtual memory mappings and on-chip memories such as the local data store (LDS), are held while the kernel is executing regardless of whether the kernel needs the resources. This leads to a waste of memory resources when the kernel initially requires a relatively large amount of memory, but the kernel's memory resource requirements decrease over time. Memory resources are required for efficient execution of the kernel. Maintaining unnecessary memory allocations therefore reduces the efficiency of the kernel. Furthermore, workgroups cannot be dispatched until sufficient memory resources are available, which limits the number of workgroups that are concurrently executing on the GPU.

FIGS. 1-4 disclose techniques for dynamic memory management in a GPU that includes an additional coprocessor to manage a memory pool that is initially allocated to the GPU by a host CPU. In some embodiments, the host CPU allocates the memory pool to the GPU by writing configuration information to a set of registers in the GPU and loading memory management code into the coprocessor. In operation, the coprocessor receives a request from a kernel executing on the GPU to modify the memory allocation associated with the kernel. Modifying the memory allocation includes increasing the memory allocation in response to the kernel requesting additional memory resources and decreasing the memory allocation in response to the kernel requesting that a portion of the previously allocated memory resources be deallocated or freed. The kernel requests modification of the memory allocation by initiating an interrupt using an appropriate instruction, polling a memory location, or writing the request to a doorbell signal, e.g., a memory location. The coprocessor modifies the memory allocation by modifying the configuration information stored in the set of registers in the GPU.

Some embodiments of the coprocessor communicate values of arguments that define the newly allocated memory to the kernel by writing the arguments to another set of registers in the GPU. For example, the coprocessor can write the address of a first byte of a dynamically allocated region of memory and, in some cases, descriptors associated with the dynamically allocated region of memory to corresponding registers that are visible to the kernel. Other embodiments of the coprocessor communicate the values of the arguments without writing to a register by pre-allocating an argument buffer at a location in memory that is known by the coprocessor and (optionally) a compiler of the kernel. A dereference is then used to load the address of the argument buffer. In some embodiments, the coprocessor launches tasks (i.e., kernels whose arguments are provided at runtime) that dynamically allocate and release memory during the lifetime of the task. Dynamic data structures can also be allocated by the coprocessor.

FIG. 1 is a block diagram of a processing device 100 in accordance with some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a graphics processing unit (GPU) 115 that is configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing. In the illustrated embodiment, the GPU 115 implements multiple processing elements (also referred to as compute units) 125 that are configured to execute instructions concurrently or in parallel. The GPU 115 also includes an internal (or on-chip) memory 130 that includes a local data store (LDS), as well as caches, registers, or buffer is utilized by the processing elements 125. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 135 of instructions from a program code that is to be executed by the GPU 115.

The processing system 100 also includes a central processing unit (CPU) 140 that is connected to the bus 110 and can therefore communicate with the GPU 115 and the memory 105 via the bus 110. In the illustrated embodiment, the CPU 140 implements multiple processing elements (also referred to as processor cores) 143 that are configured to execute instructions concurrently or in parallel. The CPU 140 can execute instructions such as program code 145 stored in the memory 105 and the CPU 140 can store information in the memory 105 such as the results of the executed instructions. The CPU 140 is also able to initiate graphics processing by issuing draw calls to the GPU 115.

An input/output (I/O) engine 150 handles input or output operations associated with the display 120, as well as other elements of the processing system 100 such as keyboards, mice, printers, external disks, and the like. The I/O engine 150 is coupled to the bus 110 so that the I/O engine 150 is able to communicate with the memory 105, the GPU 115, or the CPU 140. In the illustrated embodiment, the I/O engine 150 is configured to read information stored on an external storage component 155, which is implemented using a non-transitory computer readable medium such as a compact disk (CD), a digital video disc (DVD), and the like. The I/O engine 150 can also write information to the external storage component 155, such as the results of processing by the GPU 115 or the CPU 140.

In operation, the CPU 140 issues commands or instructions (referred to herein as "draw calls") to the GPU 115 to initiate processing of a kernel that represents the program instructions that are executed by the GPU 115. Multiple instances of the kernel, referred to herein as threads or work items, are executed concurrently or in parallel using subsets of the processing elements 125. In some embodiments, the threads execute according to single-instruction-multiple-data (SIMD) protocols so that each thread executes the same instruction on different data. The threads can be collected into workgroups that are executed on different processing elements 125.

Memory is allocated to the kernel, the workgroups, or the threads for use while executing the instructions in the kernel. The threads access the allocated memory using virtual addresses that are mapped to physical addresses in the external memory 105, the internal memory 130, or other physical memory locations. The CPU 140 defines an initial memory allocation by writing configuration information to registers (not shown in FIG. 1 in the interest of clarity) in the GPU 115. The configuration information includes an address of a first byte of an allocated region of memory and, in some cases, one or more descriptors associated with the allocated region of memory. As discussed herein, the initial memory allocation does not always remain optimal throughout the progression of execution of the instructions in the kernel. For example, instructions early in the program flow can require a large amount of memory to store various results of the instructions but changing requirements later in the program flow can lead to the instructions requiring a smaller amount of memory. The amount of memory allocated to the kernel, the workgroups, or the threads should therefore be reduced to reflect the changing requirements. However, the conventional technique for re-allocating memory requires that execution on the GPU 115 be stopped or completed, the context for the kernel switched out, and the initial memory allocation process repeated. Alternatively, a conventional re-allocation can install the GPU 115 to wait for the host CPU to provide dynamic memory, which is also a very slow process. Thus, conventional re-allocation incurs a large performance cost.

At least in part to address this problem in the conventional practice, the GPU 115 includes a coprocessor 160 that receives requests to modify a memory allocation for a kernel concurrently with the kernel executing on one or more of the processing elements 125 in the GPU 115. The coprocessor 160 modifies the memory allocation by modifying the configuration information stored in a set of registers (not shown in FIG. 1 in the interest of clarity) in the GPU 115. Some embodiments of the kernel request modification of the memory allocation by initiating an interrupt, polling a memory location, or writing the request to a memory location that is used as a doorbell signal. The coprocessor 160 increases the memory allocation in response to the kernel requesting additional memory resources and decreases the memory allocation in response to the kernel requesting that a portion of a previously allocated memory resources be deallocated. In some embodiments, the processing elements 125, the local memory 130, and the coprocessor 160 are fabricated on the same die or substrate and interconnected using traces, wires, and other elements that are also fabricated on the same die or substrate. The latency for communication between the processing elements 125, the local memory 130, and the coprocessor 160 is therefore significantly lower than the latency for communication between the GPU 115, the (off-chip) memory 105, and the CPU 140.

Figure 2:
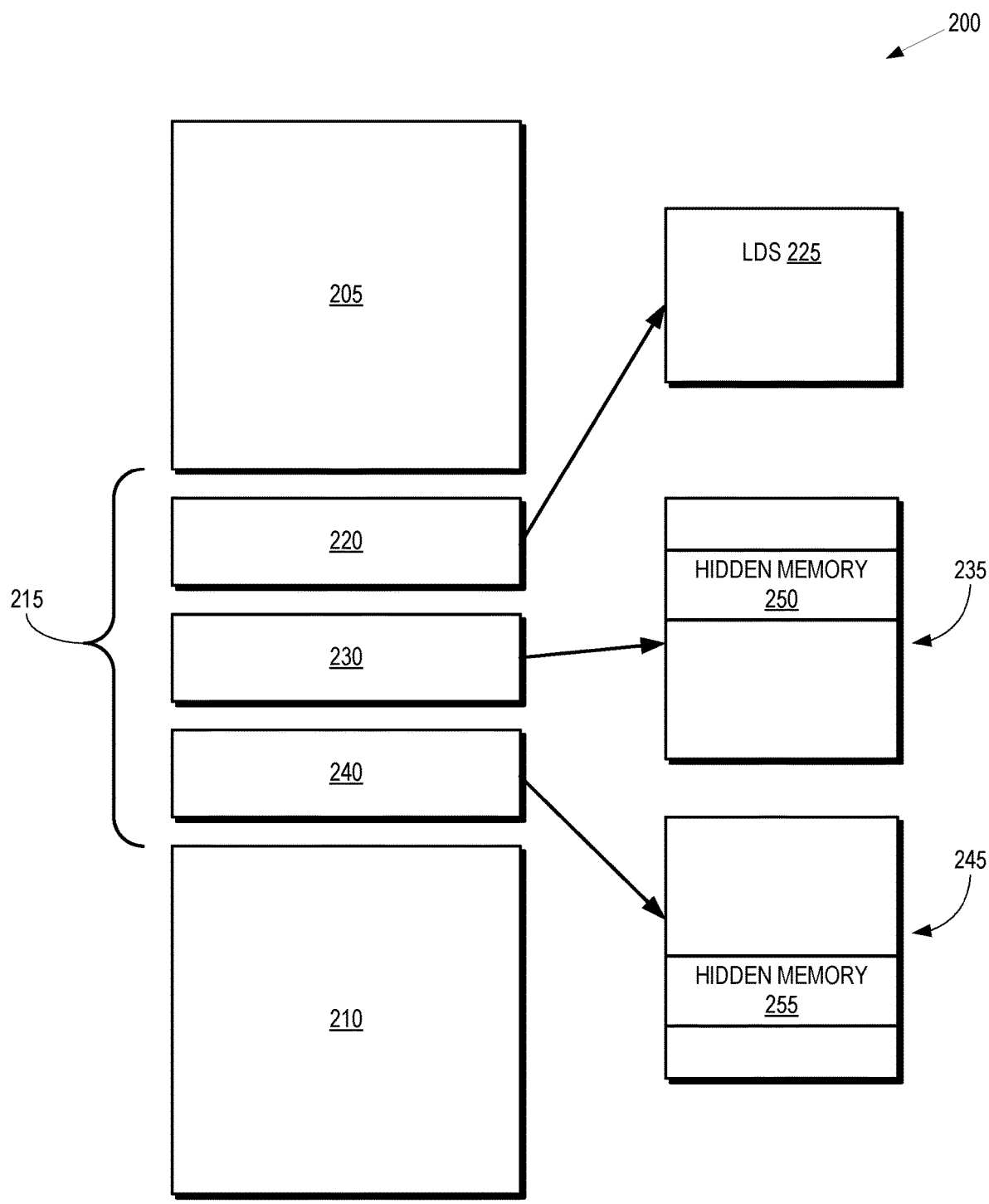
FIG. 2 is a block diagram of a memory allocation using flat addressing via a device unified architecture (DUA) according to some embodiments.

FIG. 2 is a block diagram of a memory allocation 200 using flat addressing via a device unified architecture (DUA) according to some embodiments. The memory allocation 200 is unified into an address space that includes the 64 bit virtual addresses of memory locations that are allocated to a GPU such as the GPU 115 shown in FIG. 1. Memory instructions in the instruction set architecture (ISA) implemented in the GPU access locations in physical memory elements such as the external memory 105 and the internal memory 130 shown in FIG. 1. A CPU such as the CPU 140 shown in FIG. 1 generates the memory allocation 200 prior to launching a kernel or a workgroup and the memory allocation 200 can be held for the lifetime of execution of the kernel. The CPU allocates memory for the kernel within a memory space associated with a parent task or process if the memory is mapped into the 64b address space of the memory allocation 200 and is backed by system memory such as the external memory 105 shown in FIG. 1. Compute pipes (e.g., as implemented in the processing elements 125 of the GPU 115 shown in FIG. 1) communicate with a shader pipe interface (SPI) implemented in the GPU to allocate the resources for the memory allocation 200 that are backed by on-chip memories such as the internal memory 130 shown in FIG. 1. Dispatch of a kernel to the GPU is blocked if the resources requested for execution of the kernel are not met by the memory allocation 200.

The memory allocation 200 includes portions 205, 210 that are accessible by the CPU and the GPU, as well as a portion 215 that is only accessible to the GPU and is not accessible to the CPU. The portions 205, 210, 215 are represented by virtual address ranges in the memory allocation 200. The portion 215 is sometimes referred to as a "hole." The portion 215 includes a first virtual address range 220 that is backed by a local data store 225, a second virtual address range 230 that is backed by private memory that is accessible via an address translation cache (ATC) 235, and a third virtual address range 240 that is part of the GPU virtual memory and is accessible via corresponding page tables 245. The first and second virtual address ranges 230, 240 include addresses that map to hidden private memories 250, 255, respectively.

A kernel executing on the GPU accesses the virtual address ranges 220, 230, 240 in the portion 215 using hardware apertures that map the addresses that fall within the portion 215 to the proper memory. In some embodiments, a kernel driver in the CPU is responsible for configuring the apertures by storing values of configuration information in appropriate registers implemented in the GPU. For example, apertures are defined for private memory, LDS, and GPU virtual memory. An address that falls into one of the apertures that are defined within the portion 215 are redirected to the appropriate memory. Addresses outside of the portion 215 (such as addresses in the portions 205, 210) are treated as normal virtual addresses that are mapped into the same address space as the parent process for the kernel that is executing on the CPU. In some embodiments, the memory regions in the portions 205, 210, 215 are managed as a pool and distributed using corresponding queues such as Architected Queuing Language (AQL) queues. For example, an AQL queue is allocated 4 GB of memory space for private memory and the 4 GB is divided up among different wavefronts. Hardware in the GPU detects addresses within the apertures corresponding to the portion 215 and generates virtual addresses such as 40$b$ or 48$b$ virtual addresses, which are translated using the ATC 235, page tables 245, or other address translation entities such as translation lookaside buffers, and the like.

Figure 3:
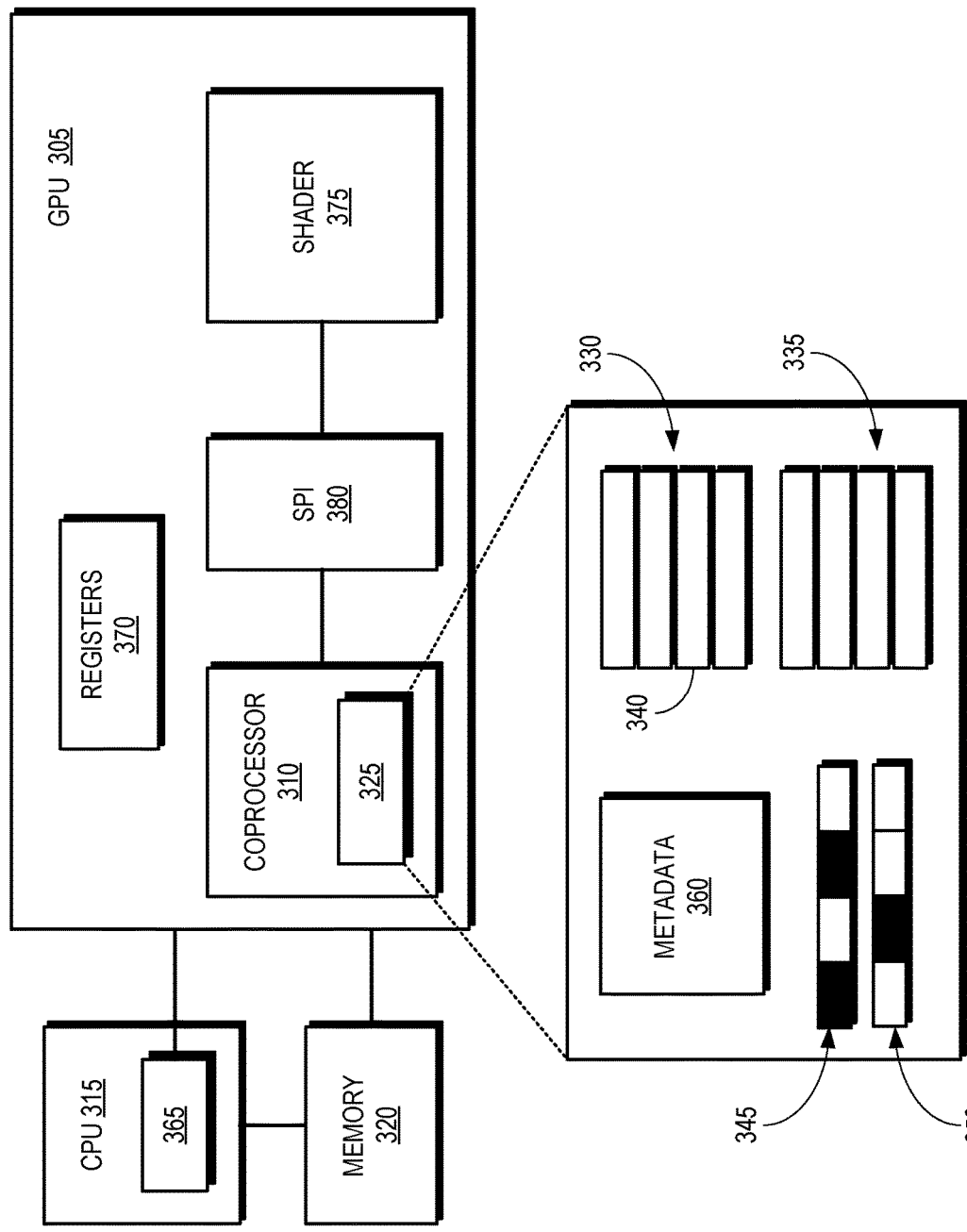
FIG. 3 is a block diagram of a processing system that includes a graphics processing unit (GPU) with an integrated coprocessor according to some embodiments.

FIG. 3 is a block diagram of a processing system 300 that includes a GPU 305 with an integrated coprocessor 310 according to some embodiments. The processing system 300 also includes a CPU 315 and an external memory 320 such as a DRAM. The processing system 300 therefore represents some embodiments of the processing system 100 shown in FIG. 1. The coprocessor 310 manages a memory pool 325. The coprocessor 310 therefore allocates or deallocates memory from the pool on behalf of kernels executing on the GPU 305. Some embodiments of the coprocessor 310 allocate memory in an address space of a process that owns the kernel via a runtime or operating system (OS) software that executes on the host CPU 315. The coprocessor 310 creates virtual mappings in a portion of the virtual address space that is visible to the host CPU 315 (e.g., the portions 205, 210 shown in FIG. 2) or a portion of the virtual address space that is not visible to the host CPU 315 (e.g., the portion 215 shown in FIG. 2).

The memory pool 325 includes memory regions 330, 335 that are partitioned into memory chunks 340 (only one indicated by a reference numeral in the interest of clarity). The memory regions 330, 335 are mapped into a virtual address space (such as the 64b virtual address space 200 shown in FIG. 2), backed by an LDS, are associated with some other physical memory. The memory pool 325 also includes free lists 345, 350 associated with the memory regions 330, 335, respectively. The blocks in the free list 345, 350 indicate whether the corresponding memory chunks 340 are free for subsequent allocation or are currently allocated and not available for allocation. For example, the blocks in the free list 345 indicate that the first memory chunk in the memory region 330 is currently allocated, the second memory chunk is free, the third memory chunk is allocated, and the fourth memory chunk is free. For another example, the blocks in the free list 350 indicate that the first memory chunk in the memory region 330 is free, the second memory chunk is allocated, and the third and fourth memory chunks are free.

The memory pool 325 also includes metadata 360 for the memory regions 330, 335. Some embodiments of the metadata 360 include start addresses of the memory regions 330, 335, sizes of the memory chunks 340, and information identifying the process, kernel, or work group that owns the corresponding memory region 330, 335. The metadata 360 can also include information indicating a memory device that backs the corresponding memory region 330, 335 or memory chunk 340, permissions for the memory regions 330, 335, and the like.

In operation, runtime or a driver 365 executing on the host CPU 315 allocates memory pages in a virtual address space to a kernel that executes on the GPU 305. Some embodiments of the driver 365 allocate the memory pages by writing configuration information to one or more registers 370. The driver 365 also initializes the coprocessor 310 by providing memory maps, code data, values of hardware registers (such as the registers 370), and the like. Code that is loaded onto the coprocessor 310 includes implementations of a memory management application programming interface (API) that is visible to kernels of a shader 375. The driver 365 also provides information characterizing the memory pool 325 to the coprocessor 310 such as information identifying the memory regions 330, 335. In response to receiving the configuration information from the driver 365, the coprocessor 310 communicates with an SPI 380 to create regions for the on-chip memories such as an LDS. The coprocessor 310 also initializes the data structures in the memory pool 325.

The coprocessor 310 dynamically allocates, reallocates, or deallocates memory in response to requests from kernels, workgroups, or tasks executing on the GPU 305. In some embodiments, a kernel executing on the shader 375 provides a request for memory management services to the coprocessor 310. The request is provided in the form of an interrupt raised by the kernel, a doorbell signal (i.e., writing to a predetermined location in memory), or other signaling. The coprocessor 310 modifies a memory allocation for the kernel in response to receiving the request. The modification includes increasing or decreasing the memory allocation, depending on the requirements of the kernel indicated in the request. If insufficient resources are available to satisfy the request, the coprocessor 310 de-schedules one or more currently running workgroups to free up memory resources for reallocation. The coprocessor 310 de-schedules the requesting kernel if the coprocessor 310 is unable to satisfy the request or the coprocessor 310 sends a notification to the kernel so that the kernel can decide how to proceed. The coprocessor 310 communicates with the SPI 380 if the request pertains to on-chip memory such as an LDS. The coprocessor 310 also updates the free list 345, 350 and the metadata 360 in response to fulfilling (or potentially not fulfilling) the request from the kernel.

In some cases, the coprocessor 310 maps the dynamically allocated memory to the kernel into a portion of a memory allocation that is not visible to the CPU 315, such as the portion 215 shown in FIG. 2. The coprocessor 310 then communicates with relevant hardware and software structures to provide information indicating any modifications to the memory mapping. For example, the reallocation performed by the coprocessor 310 can result in changes to apertures that define the portion of the memory allocation that is not visible to the CPU 315, an ATC such as the ATC 235 shown in FIG. 2, data structures associated with the OS of the host CPU 315 that are used to manage memory allocations for a process, and the like. Some embodiments of the coprocessor 310 map the newly allocated memory to an aperture that is selected by the coprocessor 310. For example, the coprocessor 310 can create a mapping from a private apertures space in response to a request to allocate memory for use by a single work item. The coprocessor 310 returns an address of a first bite of the dynamically allocated memory to the kernel. Alternatively, the coprocessor 310 updates relevant descriptors, such as a private segment buffer descriptor that is stored in a scalar register file in the registers 370. The coprocessor 310 also frees or deallocates memory following corresponding processes.

Some embodiments of the coprocessor 310 perform dynamic memory allocation in an LDS in response to requests from computer kernels. As discussed herein, there are aperture spaces such as the apertures associated with the address ranges 220, 230, 240 in the portion 215 of the memory allocation 200 shown in FIG. 2. Kernels dynamically request allocation of LDS space using a shared aperture that maps virtual addresses to the LDS. For example, a workgroup requests dynamic allocation of the LDS space. In response to receiving the request, the coprocessor 310 updates relevant hardware and software structures to indicate that the requested portion of the LDS storage is allocated to the requesting workgroup. The coprocessor 310 also provides a virtual address from the shared aperture space to the workgroup. Memory instructions use the virtual address to access the allocated LDS space. Corresponding actions are performed to free portions of the LDS storage in response to requests from the kernel.

A compiler, such as a compiler executing on the host CPU 315, generate instructions that are used to access the LDS memory and the coprocessor 310 is responsible for managing the LDS space in the memory pool 325. The coprocessor 310 allocates LDS space in response to the request from the kernel. In some embodiments, the coprocessor 310 updates base and limit registers (in the registers 370) for the LDS allocation via the SPI 380. The coprocessor 310 also de-schedules work to free LDS space, if necessary. The coprocessor 310 can also force the requesting kernel to block until space becomes available. The coprocessor 310 updates the metadata 360 related to the LDS memory, e.g., to trace how much dynamic LDS spaces available and to indicate the workgroups that currently are allocated LDS space. If the LDS space is accessed via a virtual address space, the coprocessor 310 tracks the portions of the shared aperture that have previously been allocated. Tracking can be performed dynamically or as specified during launch of the kernel.

Some embodiments of the coprocessor 310 launch tasks for execution in the GPU 305. As used herein, a task is defined as a kernel that has arguments provided at runtime. In some cases, the tasks allocate their own memory to perform computations. The memory required for the computations is not typically known beforehand, e.g., for kernels that have a workload that is dependent upon the input to the kernel. An example of an input-dependent kernel occurs in sparse matrix factorization. The amount of work and memory required to perform sparse matrix factorization is highly dependent on the sparsity patterns of the sparse matrix that is being vectorized. Depending on the sparsity pattern, the coprocessor 310 may need to allocate memory for a fill (new elements introduced in place of zeros) introduced by the matrix factorization. The coprocessor 310 therefore implements dynamic memory allocation schemes to allocate memory to tasks for the lifetime of the task and in response to a request from the task. An allocation API allows tasks to allocate memory for single work items, as well as for a wavefront, a workgroup, or at other granularities. The allocated memory can be aligned for vector loads.

Early allocation is performed if the amount of memory required by task is known ahead of time or is a function of arguments provided to the task. In this scheme, a compiler that is compiling the task code (or a programmer that writes the task code) moves calls to memory allocation routines up in the task code, e.g., to the beginning of the task code, to a control independent point. Moreover, allocation calls inside conditional statements are executed unconditionally. The memory allocation calls are serviced in response to the task beginning execution on the coprocessor 310. The task is then dispatched to the shader 370 for execution. Early release allows a task to free memory as soon as the task as finished using the allocated memory. For example, code executing on the shader 375 posts a release call to the coprocessor 310 through a predefined memory location (e.g., a doorbell signal) via an interrupt, or using other signaling.

Late allocation is performed concurrently with execution of the kernels so that the kernel allocates memory while executing, which is preferable if the amount of memory required is not known (or difficult or impossible to determine) ahead of time. Execution of a wavefront or workgroup is suspended in response to the wavefront or workgroup making an allocation call. The allocation call is then sent to the coprocessor 310 via an interrupt. The coprocessor 310 sends a return address that points to the allocated block via a register or memory location. Once the return address arrives, the wavefront or workgroup resumes execution. Late release is performed when the compiler (or programmer) moves a memory deallocation call down to a control independent point. The memory deallocation call is executed on the coprocessor 310 as part of a task continuation code in response to the task completing execution on the shader 375.

Dynamic data structures are utilized by software runtimes on the GPU 305. For example, dynamic tasking applications allocate memory for tasks. The software runtimes benefit from efficient dynamic data structures that are used to implement task pools, as well as other auxiliary data services on the GPU 305. In some embodiments, tasks or kernels generate new work or data items during execution. However, the size or volume of the new work or data items is not known prior to the task or kernel generating the work or data. Early allocation policies are used to allocate an amount of memory that is equal to a maximum amount of work or data items that are expected to be generated by the task or kernel. The early allocation is performed before the task or kernel generates the new work or data. Late allocation policies suspend execution of the task or kernel on the shader 375 so that the coprocessor 310 as an opportunity to handle the memory allocation.

The coprocessor 310 manages global data structures that are populated by the kernel, which also removes items from the global data structures. For example, if the coprocessor 310 is managing a data structure such as a standard template library (STL) vector, the early allocation policy allocates sufficient space to ensure that new items being pushed to the vector during execution of the kernel do not need to allocate more memory. For another example, if the data structure is implemented as a chunked linked list where each item is a chunk or array of items, workgroups for wavefronts send requests to the coprocessor 310 to allocate new chunks. The coprocessor 310 allocates the chunks in response to the requests and populates the chunks as necessary. The coprocessor 310 can also implement early release memory deallocation, in which code executing on the shader 375 posts release requests to the coprocessor 310, or late release memory deallocation, where the compiler (or programmer) moves deallocation calls to the end of the task, which is executed by the coprocessor 310 as part of task continuation code.

Figure 4:
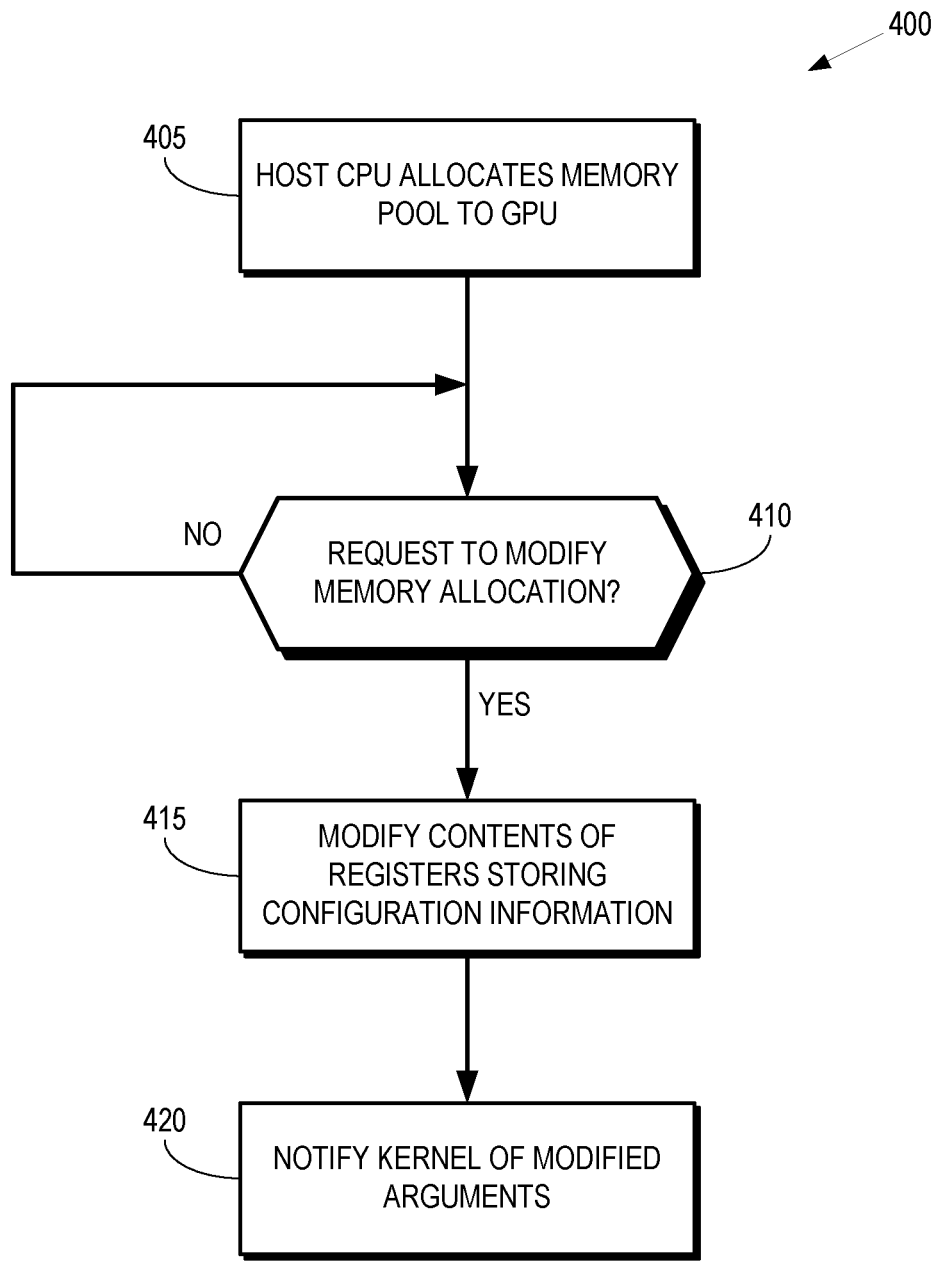
FIG. 4 is a flowchart of a method of dynamically modifying memory allocations using a coprocessor integrated with a GPU according to some embodiments.

FIG. 4 is a flowchart of a method 400 of dynamically modifying memory allocations using a coprocessor integrated with a GPU according to some embodiments. The method 400 is implemented in some embodiments of the processing system 100 shown in FIG. 1 and the processing system 300 shown in FIG. 3.

At block 405, a host CPU allocates memory to a memory pool implemented in the GPU. In some embodiments, the memory pool is integrated in and managed by the coprocessor. Some embodiments of the host CPU allocate the memory by writing values of configuration information to registers in the GPU.

At decision block 410, the coprocessor monitors the system to determine whether a request for modification of the memory allocation has been received from a currently executing kernel. Some embodiments of the coprocessor wait for an interrupt or monitor a doorbell signal that indicates a request for the modification. If no request has been received, the coprocessor continues to monitor the system. In response to receiving a request, the method 400 flows to block 415.

At block 415, the coprocessor modifies the memory allocation of the kernel that issued the request. Modifying the memory allocation includes increasing an amount of memory allocated to the kernel in response to the kernel requesting additional resources and decreasing the amount of memory allocated to the kernel in response to the kernel freeing resources that are no longer being used. The coprocessor indicates the modification of the memory allocation by modifying contents of registers that store configuration information for the GPU.

At block 420, the coprocessor notifies the kernel (and other entities in the processing system) of the change in the memory allocation by writing modified values of arguments to one or more registers.

In some embodiments, the apparatus and techniques described above are implemented in a system comprising one or more integrated circuit (IC) devices (also referred to as integrated circuit packages or microchips), such as the GPU-integrated coprocessor described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing unit comprising:
   a plurality of processing elements configured to execute a plurality of kernels; and
   a hardware coprocessor separate from the plurality of processing elements, configured to:
      receive, from a second processing unit external to the processing unit, prior to runtime of the plurality of kernels, an indication of allocation of a memory pool to the processing unit;
      deallocate a memory chunk of a plurality of memory chunks of the memory pool from a first kernel of the plurality of kernels during a runtime of the first kernel; and
      allocate the memory chunk to a second kernel of the plurality of kernels during a runtime of the second kernel.

2. The processing unit of claim 1, wherein the coprocessor is further configured to, subsequent to receiving the indication of allocation of the memory pool and prior to deallocating the memory chunk, allocate the memory chunk to the first kernel during the runtime of the first kernel.

3. The processing unit of claim 1, wherein the coprocessor is further configured to, subsequent to receiving the indication of allocation of the memory pool and prior to deallocating the memory chunk, allocate the memory chunk to the first kernel prior to the runtime of the first kernel.

4. The processing unit of claim 3, wherein the coprocessor is further configured to allocate the memory chunk to the first kernel in response to an initial allocation indication from the second processing unit.

5. The processing unit of claim 1, wherein the coprocessor is further configured to deallocate the memory chunk from the first kernel in response to a deallocation request from the first kernel.

6. The processing unit of claim 1, wherein the coprocessor is further configured to allocate the memory chunk to the second kernel in response to an allocation request from the second kernel.

7. The processing unit of claim 6, wherein the coprocessor is further configured to de-schedule the second kernel in response to determining that insufficient memory from the memory pool is available to satisfy the allocation request.

8. The processing unit of claim 6, wherein the coprocessor is further configured to de-schedule at least one workgroup of a kernel of the plurality of kernels in response to determining that insufficient memory from the memory pool is available to satisfy the allocation request.

9. The processing unit of claim 6, wherein the coprocessor is further configured to send an insufficient memory notification to the second kernel in response to determining that insufficient memory from the memory pool is available to satisfy the allocation request.

10. A method comprising:
    receiving, by a hardware coprocessor, prior to execution of a plurality of kernels on a plurality of processing elements separate from the coprocessor, an indication of allocation of a memory pool;
    deallocating a first memory chunk of a plurality of memory chunks of the memory pool from a first kernel of the plurality of kernels during execution of the first kernel; and
    allocating the first memory chunk to a second kernel of the plurality of kernels during execution of the second kernel.

11. The method of claim 10, wherein allocating the first memory chunk to the second kernel is performed during execution of the first kernel.

12. The method of claim 10, further comprising:
    subsequent to allocating the first memory chunk to the second kernel, deallocating a second memory chunk from the second kernel.

13. The method of claim 12, further comprising:
    subsequent to deallocating the second memory chunk from the second kernel, allocating the second memory chunk to the first kernel.

14. The method of claim 13, wherein the second memory chunk comprises the first memory chunk.

15. A processing unit comprising:
    a plurality of processing elements configured to execute a plurality of kernels;
    a first memory device; and
    a hardware coprocessor separate from the plurality of processing elements, configured to:
       deallocate a memory chunk of a plurality of memory chunks of a memory pool of the first memory device from a first kernel of the plurality of kernels during execution of the first kernel; and
       allocate the memory chunk to a second kernel of the plurality of kernels during execution of the second kernel.

16. The processing unit of claim 15, wherein the first memory device is further configured to store, within the memory pool, metadata corresponding to respective memory chunks of the plurality of memory chunks.

17. The processing unit of claim 16, wherein the metadata corresponding to a respective memory chunk comprises a start address of the respective memory chunk, a size of the respective memory chunk, information indicating a respective kernel to which the respective memory chunk is allocated, or any combination thereof.

18. The processing unit of claim 15, further comprising:
a second memory device comprising a second memory pool, wherein the coprocessor is further configured to allocate memory chunks of the second memory pool to the plurality of kernels.

19. The processing unit of claim 18, wherein the coprocessor is further configured to receive, from a second processing unit external to the processing unit, prior to execution of the plurality of kernels, an indication of allocation of the memory pool of the first memory device to the processing unit.

20. The processing unit of claim 19, wherein the second memory device is not visible to the second processing unit.

* * * * *